United States Patent [19]
Obara

[11] Patent Number: 5,969,449
[45] Date of Patent: Oct. 19, 1999

[54] ROTARY MACHINE OF INNER ROTOR TYPE

[75] Inventor: Rikuro Obara, Nagano-ken, Japan

[73] Assignee: Minebea Kabushiki-Kaisha, Nagano-ken, Japan

[21] Appl. No.: 09/028,098

[22] Filed: Feb. 23, 1998

[30] Foreign Application Priority Data

Feb. 24, 1997 [JP] Japan ..................................... 9-055641

[51] Int. Cl.$^6$ ............................ H02K 5/16; F16C 19/30; G11B 17/02
[52] U.S. Cl. ................................ 310/90; 310/89; 310/91; 384/512; 384/613; 384/615; 360/99.08; 360/99.07; 360/99.12
[58] Field of Search .................................. 310/90, 89, 91, 310/261; 360/99.12, 99.04, 99.08, 98.07; 384/613, 614, 512, 544, 908, 909, 615, 617, 499, 501, 504

[56] References Cited

U.S. PATENT DOCUMENTS

| | | | |
|---|---|---|---|
| 4,713,704 | 12/1987 | Voll et al. | 360/97 |
| 5,128,571 | 7/1992 | Itsu | 310/67 R |
| 5,606,475 | 2/1997 | Ishizuka | 360/99.08 |
| 5,723,926 | 3/1998 | Obara et al. | 310/89 |
| 5,820,273 | 10/1998 | Obara | 384/613 |
| 5,826,989 | 10/1998 | Obara et al. | 384/613 |

Primary Examiner—Nestor Ramirez
Assistant Examiner—Tran N Nguyen
Attorney, Agent, or Firm—Lowe Hauptman Gopstein Gilman & Berner

[57] ABSTRACT

A miniature inner rotor type of rotary machine having a high durability and anti-vibration property, includes a double row bearing apparatus (2) and comprises a stepped shaft (10). The shaft has a larger diameter shaft portion (10a) around which an inner rolling contact recess (11a) is formed and a reduced diameter shaft portion (10b), a first outer race (12), first balls (13) interposed between the large diameter shaft portion and the first outer race, and a ball bearing (17) comprising an inner race (14) to be fitted over the reduced diameter shaft portion (10b), a second outer race (15), and second balls (16) to be interposed between the inner race (14) and the second outer race (15). The machine further comprises a housing (1) which includes a cylindrical central housing (5) having a stator (4) mounted on an inner side thereof, a lid part (6) having at a central portion thereof a cylindrical central boss (8), and a bottom part (7) having at a central portion thereof a cylindrical central boss (9), wherein each of the first and second races (12,15) are fitted into the respective bosses (8) and (9), a top end of the larger diameter shaft portion of said stepped shaft (10) extends through the central boss (8) of the lid (6) to protrude out the housing (1), and a rotor (3) is fixedly secured to the larger diameter shaft portion of said stepped shaft (10). The central boss (9) of bottom part (7) has a bottom portion with a reduced diameter (9a), and a compressed ring shape preload spring (18) is interposed between an upper surface of the reduced diameter portion (9a) and a lower end of the second outer race (15).

8 Claims, 3 Drawing Sheets

ROTARY MACHINE OF INNER ROTOR TYPE

BACKGROUND OF THE INVENTION

1. Technical Field

The present invention relates to a rotary machine such as a motor or generator, in particular an improvement of the bearing of a rotary machine of inner rotor type.

2. Description of the Prior Art

Some bearing apparatus of the prior art employed in the rotary machine such as a motor or generator has such a structure as illustrated in FIG. 2. In this structure, a pair of ball bearings are provided on the shaft 31. These bearings comprise an inner race, an outer race, and balls disposed therebetween. The inner race of each bearing is secured to the shaft 31.

The supreme desire of the rotary machine such as the motor or generator is miniaturising thereof. Further, it is desired to miniaturise the bearing apparatus employed in these rotary machine.

One of the measures for miniaturising the bearing apparatus is to minuaturise the ball bearings to reduce the outer diameter of the outer race. However, reducing of the size of ball bearings leads to a reduction of the inner diameter of the ball bearings, so that also reduced is the diameter of the shaft on which the bearings are provided. This may raise the problems of the decreasing of the rigidity of the shaft, the decreasing of the durability of the rotary machine, and spoiling of the anti-vibration property.

On the other hand, there is a motor as rotary machine in which the inner race of the one of the bearings is eliminated by forming a recess 42a for rolling contact with the balls on the outer periphery of the shaft 41 as shown in FIG. 3.

The embodiment of the prior art as shown in FIG. 3, balls for the one side row are interposed between the inner rolling contact recess 42a formed directly on the outer peripheral surface of the shaft 41 at the upper oprtion thereof and the outer rolling contact recess 42a formed on the interior surface of the sleeve shaped outer race 43. Fitted on the reduced diameter shaft portion of the shaft 41 is a ball bearing 44 in which balls for the other side row are disposed between inner and outer races.

The lower end portion of the sleeve shaped outer race 43 and the outer race of the ball bearing 44 are fixedly fitted into the hole provided through the base plate 45 so that the bearing apparatus is standing vertically to the base. An stator 46 is mounted around the outer periphery of the sleeve shaped outer race 43, and an rotor 47 having magnets 47a secured on the interior surface thereof is fixedly fitted over the top end of the shaft 41.

In the structure of the motor as shown in FIG. 3, can be achieved the advantage that the diameter of the sleeve shaped outer race 43 can be reduced without reducing the diameter of the shaft 41, since the inner race for the one side row is not required.

However, in the bearing apparatus for the motor as illustrated in FIG. 3, the rotor can not be attached to the shaft, since the shaft 41 is enclosed for almost the entire length thereof within the sleeve shaped outer race 43, so that the structure of FIG. 3 can be applied only to the motor of outer rotor type.

The outer diameter of the motor of outer rotor type is larger than that of the motor of inner rotor type by the difference between the outer diameter of the sleeve shaped outer race and the outer diameter of the shaft, and thus the miniaturising of the motor can not be achieved.

Although the sleeve shaped outer race of the motor of FIG. 3 is required to machine in high precision, it is difficult to machine the outer race to have high precision roundness since the spacing between the outer rolling contact recess 42a and the end of the outer race fixed to the base 45 i.e. the length of the sleeve shaped outer race is a relatively large. Cosequently, the structure of FIG. 3 is not suitable for mass production.

Accordingly the object of the present invention is to provide a rotary machine of inner rotor type having a sufficient shaft rigidity, a high durability; and anti-vibration property.

SUMMARY OF THE INVENTION

These and other objects are achieved by a rotary machine of inner rotor type of the present invention. The rotary machine includes a double row bearing apparatus comprises a stepped shaft having a larger diameter shaft portion around which an inner rolling contact recess is formed and a reduced diameter shaft portion, a short cylindrical outer race on the interior surface thereof an outer rolling contact recess is formed, balls interposed between the inner and outer recesses, and a ball bearing comprising an inner race to be fitter over the reduced diameter shaft portion of the stepped shaft, an outer race, and balls to be interposed between ralling contact recesses formed on the opposite surfaces of the races; and a housing comprises a cylindrical central housing having a stator mounted on the inner side thereof, a lid part having at the central portion thereof a cylindrical central boss opened upwardly and downwardly, and a bottom part having at the central portion thereof a cylindrical central boss opened upwardly and downwardly, wherein each of the outer race provided around the larger diameter shaft portion and the outer race of the ball bearing of the double row bearing apparatus are fitted into the respective bosses, a top end of the larger diameter shaft portion of said stepped shaft extends through the central boss of the lid to protrude out the housing, and an rotor is fixedly secured to the larger diameter shaft portion of said stepped shaft.

The housing comprises a cylindrical central housing having top and bottom ends thereof opened upwardly and downwardly respectively, and a lid and a bottom closing the ends of the central housing.

Said ball bearing includes an inner race the outer diameter of which is same as the diameter of the larger diameter shaft portion of the stepped shaft, an outer race the inner diameter of which is same as the inner diameter of the outer race provided aroud the larger diameter shaft portion of the stepped shaft, and the balls for the one and the other rows are same in their diameter.

BRIEF DESCRIPTION OF THE DRAWINGS

Further feature of the present invention will become apparent to those skilled in the art to which the present invention relates from reading the following specification with reference to the accompanying drawings, in which.

DETAILED DESCRIPTION OF THE PRESENT INVENTION

A rotary machine of an inner rotor type of the present invention will now be described with reference to the embodiment of a motor of an inner rotor type shown shematically in the attached drawing.

Figure 1:
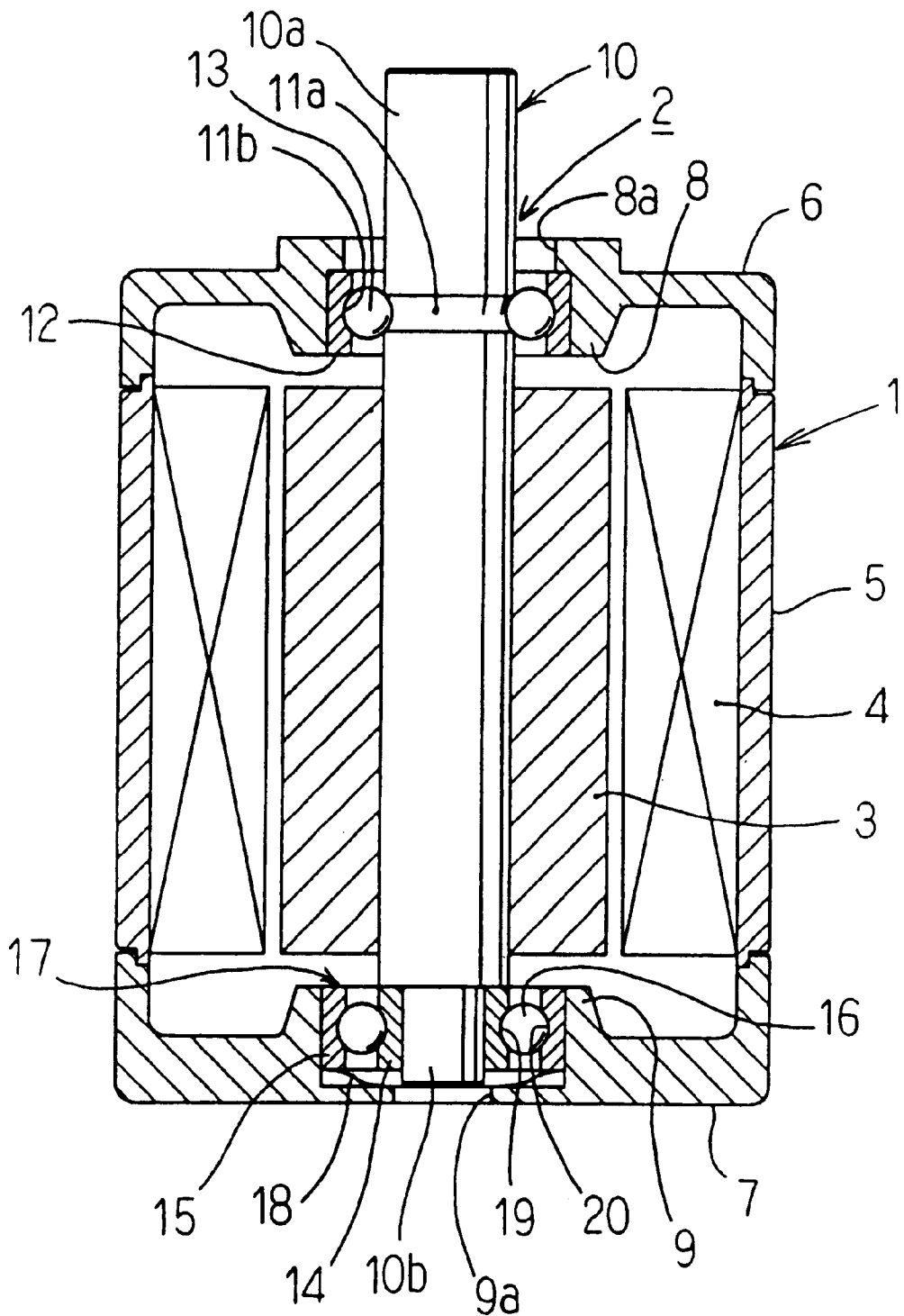
FIG. 1 is a longitudinal sectional view showing a motor as the rotary machine in accordance with the present invention.
Figure 2:
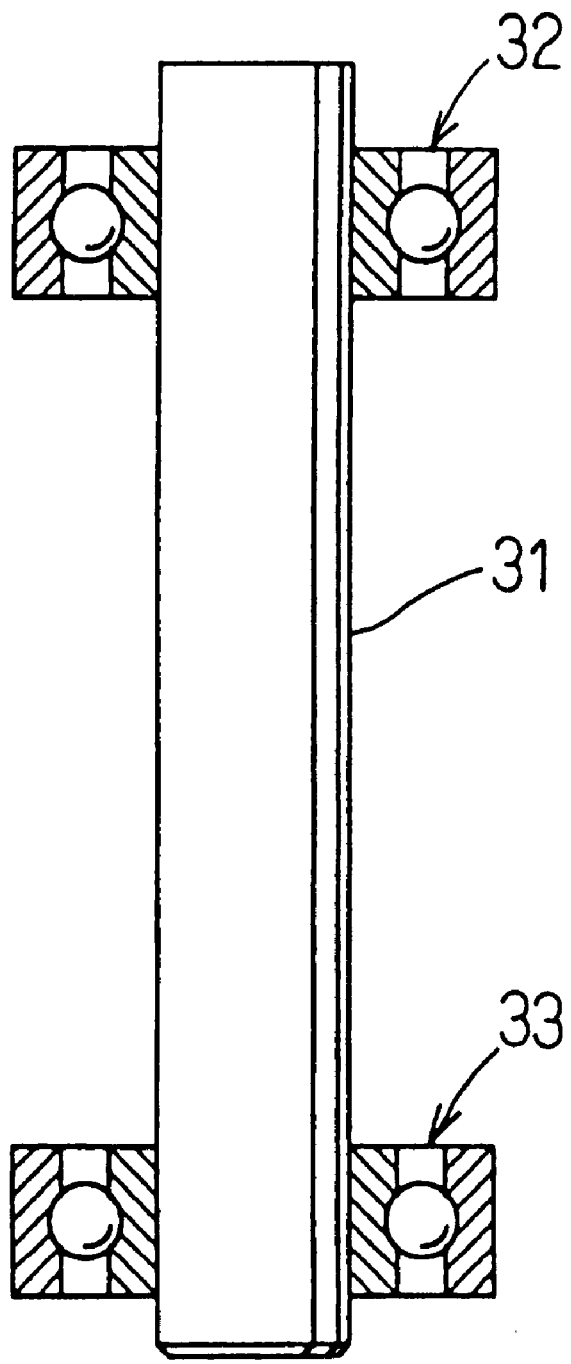
FIG. 2 is a longitudinal sectional view of the bearing apparatus utilized in the rotary machine of the prior art.
Figure 3:
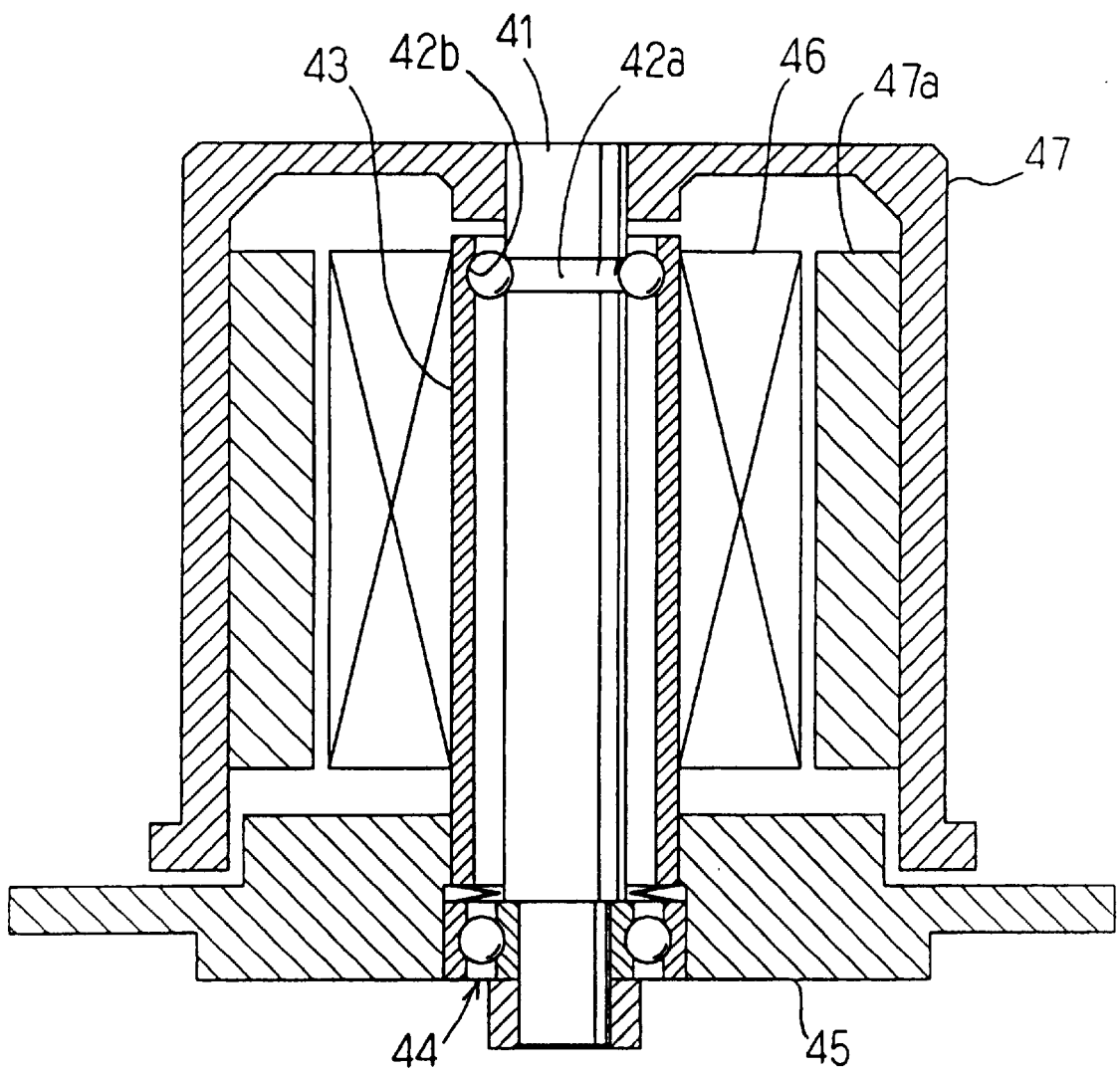
FIG. 3 is a longitudinal sectional view of the motor as the rotary machine in accordance with the prior art apparatus.

In FIG. 1, each of the reference numerals 1, 2, 3, and 4 are attached to a housing, a double row bearing apparatus, a rotor, and a stator respectively.

The housing 1 comprises a cylindrical central housing 5 having top and bottom ends thereof opened upwardly and downwardly respectively, a lid or an upper housing 6 covering the top end of the central housing 5, and a bottom or a lower housing 7 covering the bottom end of the central housing 5. The stator 4 having a coil wounded therearound is mounted on the interior surface of the central housing 5. Each of the upper and lower housings 6 and 7 is provided centrally with a central boss 8 or 9 respectively, to which each of outer races 12 and 15 of the double row bearing apparatus may be fitted.

The double row bearing apparatus 2 comprises a stepped shaft 10 including a larger diameter shaft portion 10a and a reduced diameter shaft portion 10b. The double row bearing apparatus 2 includes an inner rolling contact recess 11a formed around the outer peripheral surface of the larger diameter shaft portion 10a and an outer rolling contact recess 11b formed on the interior surface of a short cylindrical outer race 12, and balls 13 interposed between the inner and outer recesses. The double row bearing apparatus 2 further comprises a ball bearing 17 including an inner race 14 to be fitted over the reduced diameter shaft portion 10b, an outer race 15 to be fitted into the boss 9, and balls 16 to be interposed between rolling contact recesses formed on the opposite surfaces of the races 14 and 15.

The outer diameter of the inner race 14 of the ball bearing 17 is substantially same as the outer diameter of the larger diameter shaft portion 10a of the stepped shaft 10; and the inner diameter of the outer race 15 is substantially same as the inner diameter of the outer race 12, so that the diameter of the balls 13 and 16 can be made equal with each other.

The rotor 3 is fixedly secured around the outer peripheral surface of the larger diameter shaft portion 10a of the stepped shaft 10. The fixation of the rotor 3 to the stepped shaft is established by means of press fitting or with an adhesive known in the art. The fixtation of the rotor 3 to the shaft is sufficiently strong to endure the forces such as the torque or the thrust to be applied to the stepped shaft. In some cases, it is possible to use splines machined on the outer peripheral surface of the larger diameter portion 10a, so as to more rigidly secure the rotor 3 to the stepped shaft 10.

The outer race 12 provided around the larger diameter portion 10a is adapted to be fitted into the central boss 8 of the upper housing 6 so as to contact the upper surface thereof with the lower surface of a reduced diameter portion 8a formed through the top portion of the opening of the boss 8.

The outer race 15 of the ball bearing 17 is adapted to be fitted into the central boss 9 of the lower housing 7. The outer race 15 of the ball bearing 17 is prestressed by a preload spring 18 of a ring shaped compressed spring interposed between an upper surface of a reduced diameter portion 9a formed through the bottom portion of the opening of the boss 9 and the lower surface of the outer race 15.

Each of the reference numerals 19 and 20 found on FIG. 1 is attached to an inner and outer rolling contact recess formed on the inner and outer races 14 and 15 of the ball bearing 17 respectively.

Upon assembling the motor, the ball bearing is removed at first from the double row bearing apparatus. Then, the rotor 3 is secured rigidly to the larger diameter portion 10a of the stepped shaft 10 by means of press fitting or with an adhesive, and the ball bearing 17 is fitted on the reduced diameter portion 10b.

Subsequently, the preload spring 18 is disposed on the upper surface of a reduced diameter portion 9a of the lower housing 7, the ball bearing 17 of the double row bearing apparatus 2 is inserted into the boss 9, the central housing 5 having on the inner side thereof the stator 4 attached thereto is disposed around the rotor 3, the lower housing 7 is attached to the lower opening of the central housing 5, the central boss 8 of the upper housing 6 is fitted over the outer race 12 on the larger diameter shaft portion, and the upper housing is attached to the upper opening of the central housing.

In the above mentioned embodiment, although the diameter of each balls 13 and 16 for the double row bearing apparatus 2 are equal with each other, balls of different diameters can be utilized. While particular embodiment of the rotary machine as a motor have been illustrated and described hereinabove, the present invention can be applied to other motors or rotary machines such as generators.

THE EFFECTS AND ADVANTAGES OF THE PRESENT INVENTION

The rotary machine of inner rotor type of the present invention will provide the following effects and advantages.

The double row bearing apparatus employed in the rotary machine of the present invention includes an inner rolling contact recess formed directly on the outer peripheral surface of the larger diameter shaft portion so that an inner race is unnecessary. In this connection, the shaft can be made as a stepped shaft including a larger diameter shaft portion, so that the diameter of an outer race having an outer rolling contact recess opposite to the inner rolling contact recess can be reduced without decreasing the rigidity of the shaft.

In conclusion, sufficient rigidity of the shaft can be obtained by smaller double row bearing apparatus, and the rotary machine can be miniaturized without deteriorating the durability or anti-vibration property thereof.

Further, the outer race of the double row bearing apparatus is provided in the short cylindrical shape at the larger diameter portion, so that a rotor can be mounted on the larger diameter shaft portion between the outer race and the ball bearing to make the rotary machine an inner rotor type. In this connection, the rotary machine can be miniaturized.

The outer race of the double row bearing apparatus is in the shape of a short cylindrical configuration, so that the machining of the outer race is easier than the relatively long sleeve shaped outer race of the prior art apparatus. The outer race will be assembled to the stepped shaft by the bearing manufacturer, so that the precision of the rotation can be increased and the vibration and noise can be reduced.

The double row bearing apparatus of the present invention requires only one ball bearing, the number of parts thereof can be reduced. This is because the inner race to be provided on the larger diameter shaft portion is unnecessary, and the outer race to be mounted on the larger diameter portion can be provided by the common part with the outer race of the ball bearing, so that further reduction of the cost can be obtained.

While particular embodiments of the present invention have been illustrated and described, it should be obvious to those skilled in the art that various changes and modifications can be made without departing from the spirit and scope of the invention.

What is claimed is:

1. A rotary machine of inner rotor type, the rotary machine comprising:

a double row bearing apparatus (2) comprises a stepped shaft (10) having a larger diameter shaft portion (10a) around which an inner rolling contact recess (11a) is formed and a reduced diameter shaft portion (10b), a short cylindrical first outer race (12), an outer rolling contact recess (11b) formed on an interior surface of said first outer race (12), first balls (13) interposed between the inner and outer recesses, and a ball bearing (17) comprising an inner race (14) to be fitted over the reduced diameter shaft portion (10b) of the stepped shaft, a second outer race (15), and second balls (16) to be interposed between rolling contact recesses formed on opposing surfaces of the races (14) (15) of the ball bearing (17);

a housing (1) comprises a cylindrical central housing (5) having a stator (4) mounted on an inner side thereof, a lid part (6) having at a central portion thereof a cylindrical central boss (8) opened upwardly and downwardly, and a bottom part (7) having at a central portion thereof a cylindrical central boss (9) opened upwardly and downwardly, wherein said first outer race (12) provided around the larger diameter shaft portion (10a) and said second outer race (15) of the ball bearing (17) of the double row bearing apparatus (2) are fitted into the respective bosses (8)(9), a top end of the larger diameter shaft portion (10a) of said stepped shaft (10) extends through the central boss (8) of the lid (6) to protrude out of the housing (1), and a rotor (3) is fixedly secured to the larger diameter shaft portion (10a) of said stepped shaft (10);

a bottom portion of said central boss (9) of said bottom part (7) having a reduced diameter portion (9a) at an opening therein; and spring (18) interposed between an upper surface of said reduced diameter portion (9a) of said boss (9) and a lower end of said second outer race (15).

2. The rotary machine according to claim 1 wherein said housing (1) comprises a cylindrical central housing (5) having top and bottom ends thereof opened upwardly and downwardly, said lid part (6) and said bottom part (7) closing each end of the central housing (5).

3. The rotary machine according to claim 2 wherein an outer diameter of the inner race (14) of said ball bearing (17) is same as an outer diameter of the larger diameter shaft portion (10a) of the stepped shaft (10), an inner diameter of the second outer race (15) of said ball bearing (17) is same as an inner diameter of the first outer race (12) provided around the larger diameter shaft portion (10a), and the diameter of the first and second balls (13)(16) are equal with each other.

4. The rotary machine according to claim 1 wherein an outer diameter of the inner race (14) of said ball bearing (17) is same as an outer diameter of the larger diameter shaft portion (10a) of the stepped shaft (10), an inner diameter of the second outer race (15) of said ball bearing (17) is same as that of the first outer race (12) provided around the larger diameter shaft portion (10a), and the diameter of the first and second balls (13)(16) are equal with each other.

5. The rotary machine according to claim 1, wherein said spring (18) comprises a preload spring.

6. The rotary machine according to claim 5, wherein said preload spring (18) comprises a compressed ring shaped spring prestressing said second outer race (15) of said ball bearing (17).

7. The rotary machine according to claim 1, wherein said spring (18) comprises a ring shaped spring.

8. The rotary machine according to claim 1, wherein said spring (18) comprises a compressed ring shaped spring.

* * * * *